(12) United States Patent
Chen et al.

(10) Patent No.: US 9,451,137 B2
(45) Date of Patent: Sep. 20, 2016

(54) PCB-MOUNTABLE LENS ADAPTER FOR A PCB-MOUNTABLE CAMERA MODULE

(71) Applicant: OmniVision Technologies, Inc., Santa Clara, CA (US)

(72) Inventors: Wei-Ping Chen, New Taipei (TW); Tsung-Wei Wan, Baoshan Township (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 117 days.

(21) Appl. No.: 14/465,292

(22) Filed: Aug. 21, 2014

(65) Prior Publication Data

US 2016/0057323 A1 Feb. 25, 2016

(51) Int. Cl.
*H04N 5/225* (2006.01)

(52) U.S. Cl.
CPC ................... *H04N 5/2254* (2013.01)

(58) Field of Classification Search
CPC ............ H04N 5/2254; H04N 5/2259; G02B 13/0085; G02B 13/001–13/009
See application file for complete search history.

(56) References Cited

U.S. PATENT DOCUMENTS

| 4,880,974 A * | 11/1989 | Yamakawa | G01J 1/02 250/216 |
| 6,504,655 B2 | 1/2003 | Shibayama | |
| 7,379,112 B1 * | 5/2008 | Raad | H04N 5/2254 348/340 |
| 7,454,128 B2 * | 11/2008 | Lang | H04N 5/2252 348/118 |
| 7,468,850 B2 * | 12/2008 | Chang | H04M 1/0264 348/374 |
| 8,237,855 B2 * | 8/2012 | Chou | H04N 5/2251 348/148 |
| 8,279,544 B1 | 10/2012 | O'Neill | |
| 8,570,660 B2 | 10/2013 | Takemoto et al. | |
| 8,937,681 B2 * | 1/2015 | Westerweck | H04N 5/2254 348/335 |
| 2004/0116166 A1 * | 6/2004 | Makishima | H04N 5/2254 455/575.1 |
| 2004/0227838 A1 * | 11/2004 | Atarashi | G02B 3/14 348/340 |
| 2005/0237625 A1 * | 10/2005 | Wei | G03B 11/00 359/676 |
| 2006/0054802 A1 * | 3/2006 | Johnston | G02B 27/62 250/239 |
| 2006/0146170 A1 | 7/2006 | Saito et al. | |
| 2006/0171704 A1 * | 8/2006 | Bingle | H04N 5/2252 396/419 |
| 2006/0193064 A1 * | 8/2006 | Kim | H04N 5/2254 359/811 |

(Continued)

FOREIGN PATENT DOCUMENTS

CN 101149558 A 3/2008
JP 2006-309011 A 11/2006

OTHER PUBLICATIONS

Symmons, et al. "Molded Optics: Precision Molded Glass Challenges Plastic Optics," retrieved from http://www.laserfocasworld.com/articles/2011/07/molded-optics-precision-molded-glass-challenges-plastic-optics.html Jul. 1, 2011.

(Continued)

*Primary Examiner* — Jason Flohre
(74) *Attorney, Agent, or Firm* — Lathrop & Gage LLP (57) ABSTRACT

A PCB-mountable lens adapter includes an adapter lens for being a component of an imaging system that has a second field of view different from the first field of view, the imaging system comprising the adapter lens and the camera lens; and an adapter housing for holding the adapter lens and for attaching to a PCB. A method for modifying the field of view of an camera module includes attaching a PCB-mountable lens adapter to a PCB, the PCB-mountable lens adapter including an adapter lens mounted in an adapter housing, the PCB being configured for surface-mounting of the camera module thereto.

18 Claims, 7 Drawing Sheets

(56) References Cited

U.S. PATENT DOCUMENTS

| | | | |
|---|---|---|---|
| 2007/0058070 A1* | 3/2007 | Chen | H04N 5/2254 348/340 |
| 2007/0086777 A1* | 4/2007 | Fujita | G02B 7/026 396/452 |
| 2008/0266675 A1* | 10/2008 | Chiang | G02B 7/10 359/700 |
| 2009/0015706 A1* | 1/2009 | Singh | H04N 5/2253 348/340 |
| 2009/0143099 A1* | 6/2009 | Kang | H04N 5/23209 455/556.1 |
| 2010/0278524 A1* | 11/2010 | Woo | H04N 5/2257 396/529 |
| 2011/0007202 A1* | 1/2011 | Chiang | H04N 5/2254 348/345 |
| 2011/0085245 A1 | 4/2011 | Kim | |
| 2012/0075519 A1* | 3/2012 | Blasch | H04N 5/2254 348/340 |
| 2012/0248195 A1* | 10/2012 | Feng | H01L 27/14625 235/472.01 |
| 2014/0128673 A1 | 5/2014 | Cheng | |

OTHER PUBLICATIONS

Pontinen, "Study on Chromatic Aberration of Two Fisheye Lenses," The Intl Archives of Photogrammetry, Remote Sensing and Spatial Information Services, vol. XXXVII, Part B3a, Beijing 2008.

English Translation of Office Action in Taiwan Application No. 104127403, dated Jul. 19, 2016, 4 pages.

* cited by examiner

PRIOR ART
FIG. 1

PRIOR ART

PCB-MOUNTABLE LENS ADAPTER FOR A PCB-MOUNTABLE CAMERA MODULE

BACKGROUND

Digital cameras are used in a variety of consumer, industrial and scientific imaging devices to produce still images and/or video. Such digital cameras are for example implemented in webcams and mobile telephones and include a camera module such as a reflowable camera module (RCM) attached to a printed circuit board (PCB). The field of view (FOV) of an RCM is typically between 60 degrees and 70 degrees. The FOV can be increased by attaching an adapter lens in front of the camera module. The resulting imaging system (adapter lens plus camera module) has a wider FOV than the camera module alone. A wide FOV is valuable in applications such as autonomous vehicle navigation, car parking monitor systems, and gesture recognition.

An adapter lens that provides an ultra-wide field of view, e.g., 180°, is called a fisheye adapter lens or fisheye conversion lens. Existing fisheye adapter lenses removably attach to the outside of a digital camera. In one example a clip is used to attach the fisheye adapter lens to the digital camera so that it aligns with the camera module. In another example, a case encloses a mobile device (e.g., a cell phone) that includes an internal camera module and holds the fisheye adapter lens adjacent to the internal camera module.

SUMMARY OF THE INVENTION

According to one embodiment, a PCB-mountable lens adapter for a device that includes a camera module having a camera lens with a first field of view is provided. The PCB-mountable lens adapter includes an adapter lens for being a component of an imaging system that has a second field of view different from the first field of view, the imaging system comprising the adapter lens and the camera lens; and an adapter housing for holding the adapter lens and for attaching to a printed circuit board (PCB).

According to another aspect, a method for modifying the field of view of a camera module is provided. The method includes attaching a PCB-mountable lens adapter to a PCB, the PCB-mountable lens adapter including an adapter lens mounted in an adapter housing, the PCB being configured for surface-mounting of the camera module thereto.

DETAILED DESCRIPTION

The prior-art adapter lenses discussed above are externally-attached: they attach to an external portion of the device containing a reflowable camera module (RCM). Such externally-attached adapter lenses have several drawbacks. First, they increase the device volume, which may reduce the device's value depending on its function and context of use. Second, the distance between the adapter lens and RCM can limit achievable image quality. And third, imprecise alignment of the adapter lens to the RCM lens can degrade image quality.

This disclosure relates to a PCB-mountable lens adapter for a camera module, such as a RCM. Although the description hereinbelow discusses RCMs, it should be appreciated that camera modules that are mountable to a PCB by means other than reflow soldering could be utilized without departing from the scope hereof.

Part or all of a PCB-mountable lens adapter as described herein is directly and permanently attached to the PCB that also attaches to the RCM. Compared to external attachment, such attachment adds less volume to the device and reduces the distance between the adapter lens and RCM which further eases constraints on image quality. Permanent attachment of the PCB-mountable lens adapter to the PCB also ensures accurate alignment of the adapter lens to the reflowable camera lens, and ensures that the accurate alignment remains constant.

Figure 1:
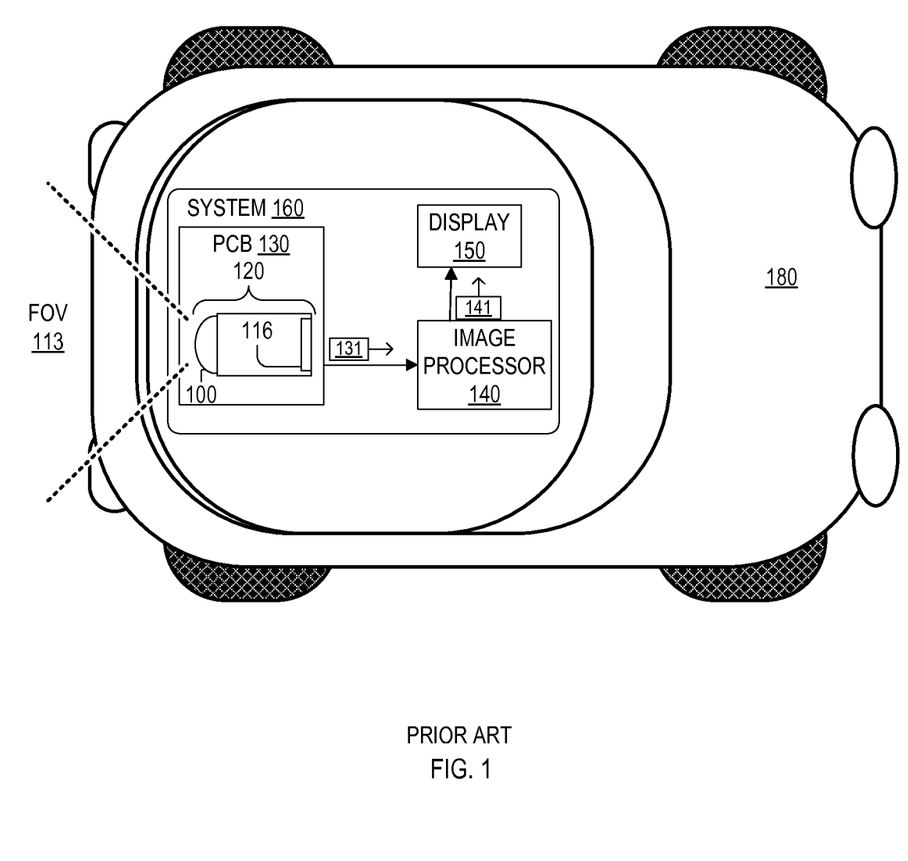
FIG. 1 shows a prior-art vehicle equipped with a parking assist system with a printed circuit board (PCB), an image processor, and a display.

FIG. 1 shows a prior-art vehicle 180 equipped with a parking assist system 160. Parking assist system 160 includes a printed circuit board (PCB) 130, an image processor 140, and a display 150. PCB 130 includes a RCM 120. RCM 120 includes a camera lens 100 and an image sensor 116. Camera lens 100 is for example a compound lens with a field-of-view (FOV) 113 substantially less than 180°. Image sensor 116 is for example implemented using complementary metal-oxide-semiconductor (CMOS) technology.

Camera lens 100 images an object in its FOV 113 onto image sensor 116, which generates and sends raw image data 131 to image processor 140. Image processor 140 transforms at least part of raw image data 131 into output view data 14 displayed on display 150.

Figure 2:
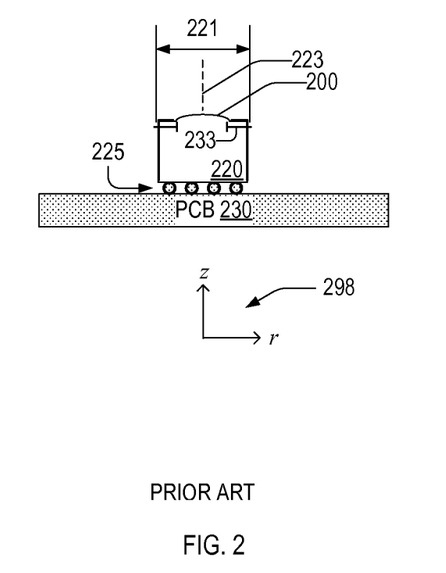
FIG. 2 is a cross-sectional view of the prior-art PCB of FIG. 1, which includes an RCM soldered to the PCB.

FIG. 2 is a cross-sectional view of a PCB 230, which includes an RCM 220 mechanically and electrically connected thereto with solder bumps 225. RCM 220 has RCM diameter 221 and includes camera lens 200. Camera lens 200 has an entrance pupil 233.

Camera lens 200 has an optical axis 223. With respect to coordinate axes 298, optical axis 223 is parallel to the z-axis and has radial position r=0. RCM 220 and PCB 230 f function as RCM 120 and PCB 130, respectively, in parking assist system 160.

Figure 3:
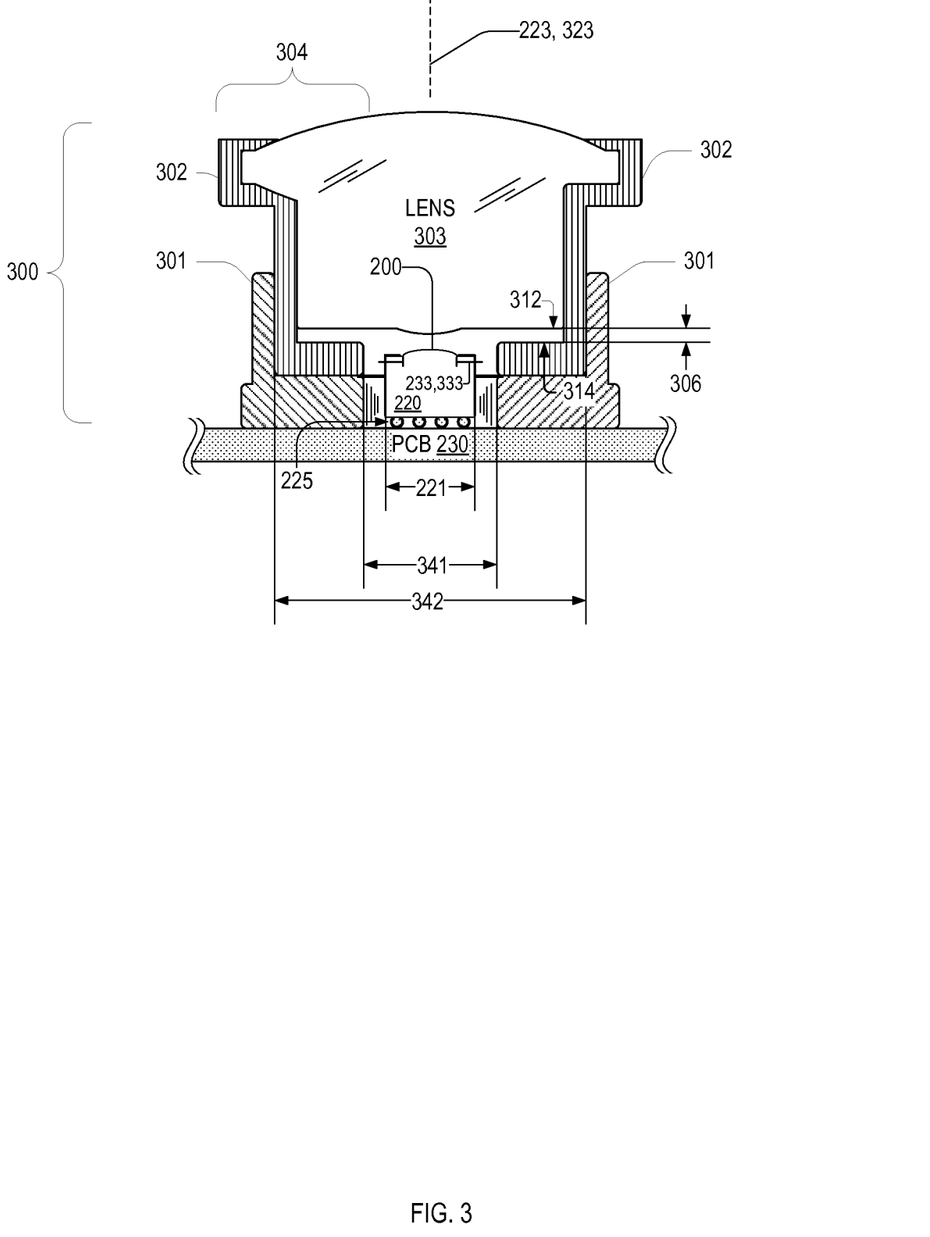
FIG. 3 shows further detail of the PCB shown in FIG. 2, with the addition of one PCB-mountable lens adapter mounted on the PCB and encircling the RCM, in an embodiment.

FIG. 3 shows one PCB-mountable lens adapter 300 mounted on PCB 230 and encircling RCM 220. PCB-mountable lens adapter 300 includes an adapter housing 304 and an adapter lens 303. Adapter housing 304 includes a holder 301 and a lens barrel 302. In FIG. 3, holder 301 is attached to PCB 230 and surrounds RCM 220. Holder 301 may partially surround RCM 220 without departing from the scope herein. Holder 301 is sized and shaped so that holder 301 does not obstruct the field of view of RCM 220 when attached to PCB 230 (or RCM 220).

Holder 301 may be attached to PCB 230 via methods known in the art, such as by adhesive bonding and mechanical fastening. An intermediate part (not shown) may be between holder 301 and PCB 230 depending on design considerations and without departing from the scope hereof. The intermediate part may be a coupler that facilitates attachment of holder 301 to PCB 230.

In an embodiment of PCB-mountable lens adapter 300, lens barrel 302 is removably attached to holder 301. In another embodiment of PCB-mountable lens adapter 300, lens barrel 302 is permanently attached to holder 301.

Unlike prior-art adapter lenses that attach to the outside of an imaging device, PCB-mountable lens adapter 300 is attached to PCB 130, an interior component of the imaging device. PCB-mountable lens adapter 300 and RCM 220 are may independently attach to PCB 230 too.

In an embodiment of PCB-mountable lens adapter 300, holder 301 attaches to one or both of RCM 220 and PCB 230, which are for example interior components of parking assist system 160. RCM 220 may attach to holder 301 before or after holder 301 is attached to PCB 230.

Adapter lens 303 is for example a single-element lens, as depicted in FIG. 3. But adapter lens 303 may instead be a compound lens that includes multiple individual optical elements.

PCB-mountable lens adapter 300 mounts on PCB 230 such that adapter lens 303 and camera lens 200 are axially aligned (coaxial): adapter lens 303 has an optical axis 323 collinear with optical axis 223 of camera lens 200. An exit pupil 333 of adapter lens 303 is located in the same plane as entrance pupil 233 of camera lens 200. Exit pupil 333 and entrance pupil 233 are hence coplanar.

For purposes of clarity, when an entrance pupil of a first lens is coaxial with the exit pupil of second lens it means that the first and second lenses are coaxial. Hence, regarding PCB-mountable lens adapter 300 mounted on PCB 230, entrance pupil 233 and exit pupil 333 are both coaxial and coplanar.

Adapter lens 303 has a lens surface 312 and holder 301 has a holder surface 314 separated from lens surface 312 by a distance 306. If exit pupil 333 and entrance pupil 233 are coplanar, then distance 306 may be zero.

PCB-mountable lens adapter 300 may be designed such that camera lens 200 and adapter lens 303 collectively function as a macro lens, a zoom lens, a telephoto lens, a wide angle lens, or a fisheye lens. In one example of PCB-mountable lens adapter 300, adapter lens 303 is a three-piece all-aspheric adapter fisheye lens system described in U.S. patent application Ser. No. 14/465,013 filed Aug. 21, 2014 and entitled "Three-piece all-aspheric adapter fisheye lens system." In another example of PCB-mountable lens adapter 300, adapter lens 303 is a four-piece all-aspheric adapter fisheye lens system described in U.S. patent application Ser. No. 14/465,146 filed Aug. 21, 2014 and entitled "Four-piece all-aspheric adapter fisheye lens system."

Holder 301 has a first inner diameter 341 and a second inner diameter 342. Inner diameter 341 is sized to be equal to or greater than RCM diameter 221 such that holder 301 may be disposed on PCB 230 and at least partially surround RCM 220. Second inner diameter 342 is sized such that lens barrel 302 may be inserted into holder 301. Holder 301 may be a machined or molded part and may be formed of a metal, such as aluminum or brass, or plastic. Holder 301 may be fabricated via other means and materials without departing from the scope herein.

Figure 4:
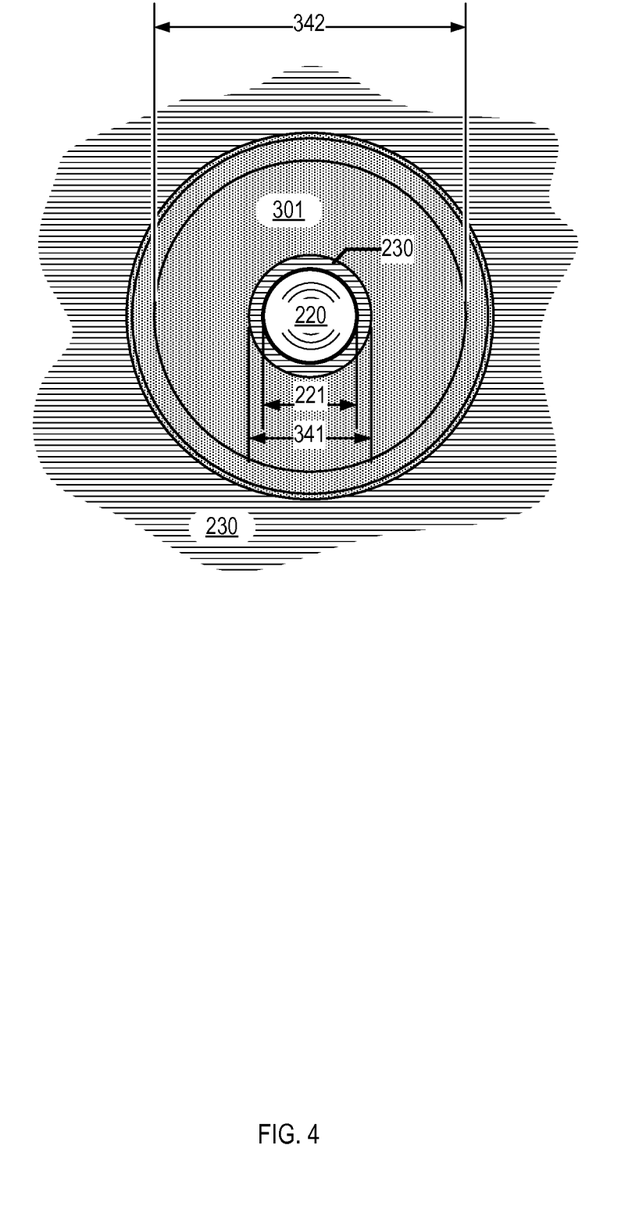
FIG. 4 is a plan view of a holder of the PCB-mountable lens adapter of FIG. 3 mounted on the PCB and encircling the RCM.

FIG. 4 is a plan view of holder 301 mounted on PCB 230 and encircling RCM 220. In an embodiment of holder 301, first inner diameter 341 is larger than RCM diameter 221 such that PCB 230 is visible in the region between holder 301 and RCM 220. In an embodiment of holder 301, the first inner diameter 341 equals RCM diameter 221 such that holder 301 is in physical contact with RCM 220. In this embodiment, holder 301 prevents electromagnetic interference from reaching RCM 220.

Figure 5:
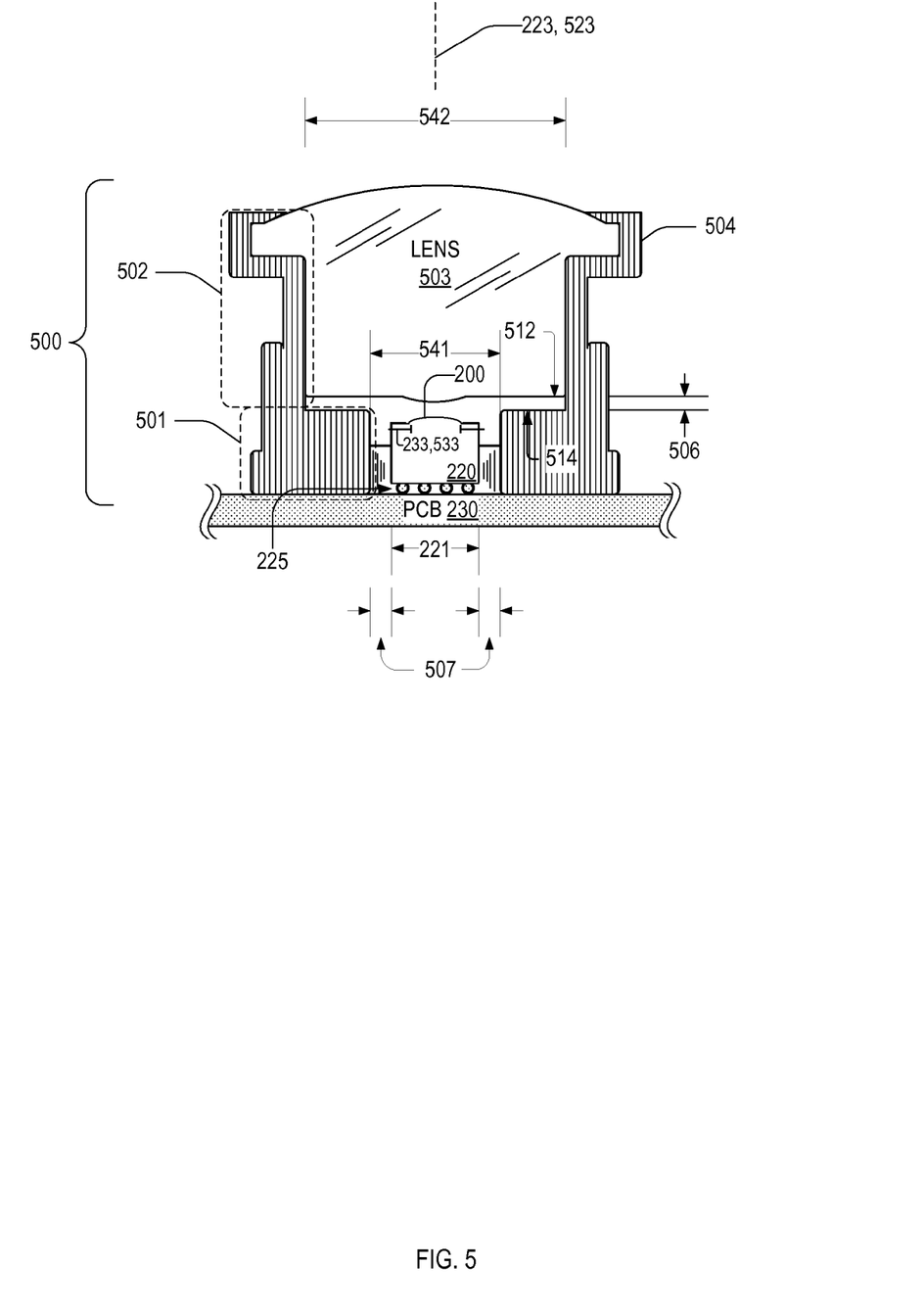
FIG. 5 is a cross-sectional view of another PCB-mountable lens adapter mounted on the PCB of FIG. 2 and encircling the RCM, in an embodiment.

FIG. 5 is a cross-sectional view of another PCB-mountable lens adapter 500 mounted on PCB 230 and encircling RCM 220. Whereas PCB-mountable lens adapter 300 includes three parts, holder 301, lens barrel 302, and adapter lens 303, PCB-mountable lens adapter 500 includes two parts: an adapter housing 504 and an adapter lens 503. Adapter lens 503 is similar to adapter lens 303, FIG. 3.

In an embodiment of PCB-mountable lens adapter 500, adapter housing 504 attaches to one or both of RCM 220 and PCB 230. RCM 220 may be attached to adapter housing 504 before either RCM 220 or adapter housing 504 is attached to PCB 230.

In FIG. 5, adapter housing 504 is shown attached to PCB 230 and holds adapter lens 503, such that adapter housing 504 is attached to PCB 230 and surrounds RCM 220. Adapter housing 504 may partially surround RCM 220 without departing from the scope herein. Adapter housing 504 is sized and shaped such when attached to PCB 230 (or RCM 220), holder 301 does not obstruct the FOV of RCM 220.

Adapter housing 504 may be attached to PCB 230 via methods known in the art, such as adhesive bonding and mechanical fastening. An intermediate part may be disposed between adapter housing 504 and PCB 230 without departing from the scope hereof.

In an embodiment of PCB-mountable lens adapter 500, adapter lens housing 504 has a holder region 501 and a lens barrel region 502. Adapter housing 504 can be viewed as a fusion of holder 301 and lens barrel 302, where holder region 501 functions as holder 301 and lens barrel region 502 functions as lens barrel 302.

PCB-mountable lens adapter 500 mounts on PCB 230 such that adapter lens 503 and camera lens 200 are coaxial: adapter lens 503 has an optical axis 523 that is collinear with optical axis 223 of camera lens 200. An exit pupil 533 of adapter lens 503 is located in the same plane as entrance pupil 233 of camera lens 200; thus exit pupil 533 and entrance pupil 233 are coplanar.

The distance between lens surface 512 and mount surface 514 is distance 506. Distance 506 may be zero when exit pupil 533 and entrance pupil 233, since lens surface 512 adjoins mount surface 514 directly.

Adapter housing 504 has a first inner diameter 541 and a second inner diameter 542. Adapter housing 504 may be a machined part or molded part and may be formed of a metal, such as aluminum or brass, or of plastic. Adapter housing 504 may be fabricated via other means and of other materials without departing from the scope hereof.

In an embodiment of adapter housing 504, first inner diameter 541 is larger than RCM diameter 221 such that a gap of width 507 is between adapter housing 504 and RCM 220. In another embodiment of adapter housing 504, the first inner diameter 541 equals RCM diameter 221, such that width 507 equals zero and adapter housing 504 adjoins RCM 220. When width 507 equals zero, adapter housing 504 acts to prevent electromagnetic interference from reaching RCM 220.

Figure 6:
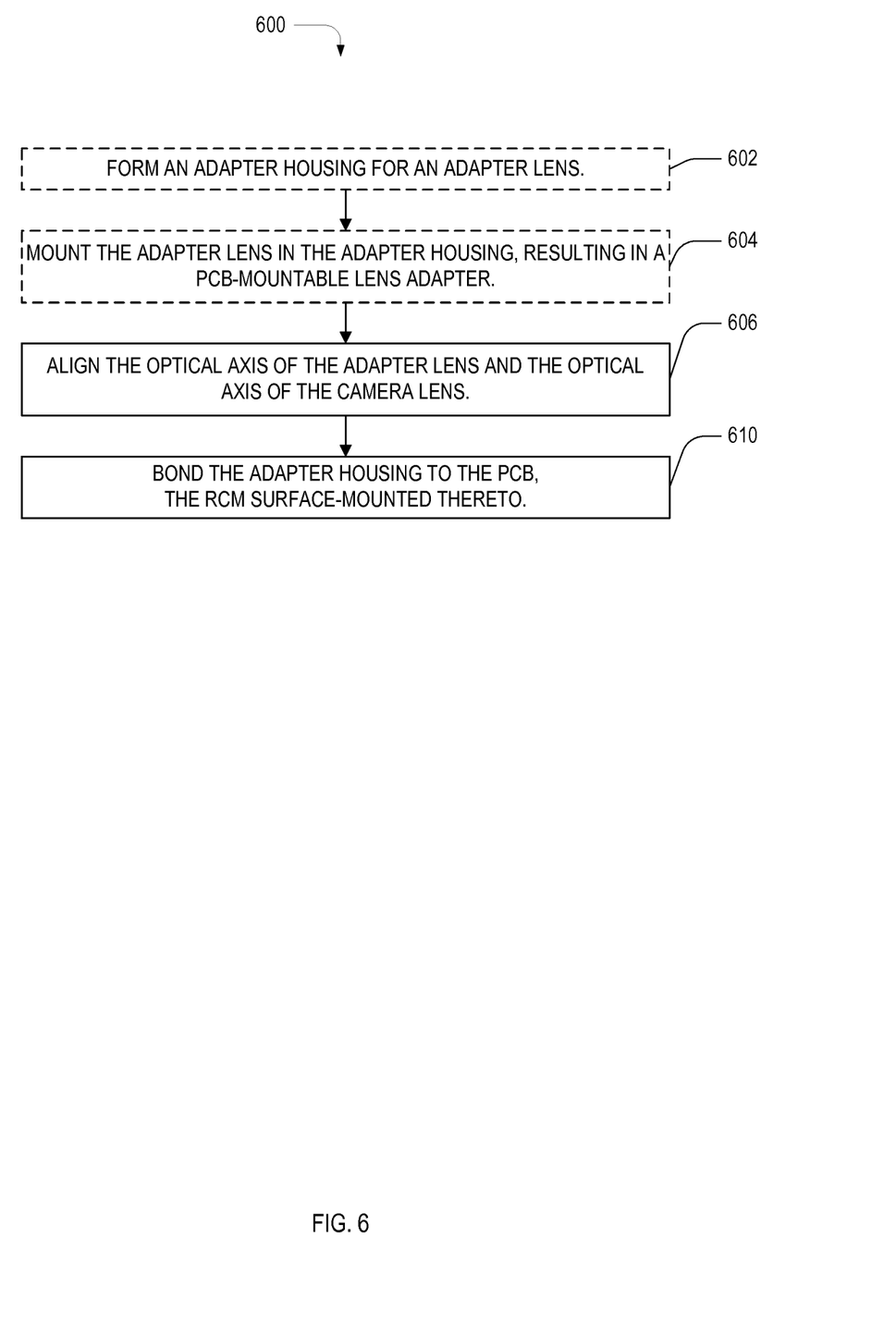
FIG. 6 is a flowchart illustrating one method for modifying the field of view of an RCM, where the RCM is already bonded to a PCB, in an embodiment.

FIG. 6 is a flowchart illustrating an exemplary method 600 for modifying the FOV of a RCM, where the RCM is bonded to a PCB and includes a camera lens. In optional step 602, method 600 forms adapter housing for an adapter lens. The adapter housing is formed such that an exit pupil of the adapter lens and an entrance pupil of the camera lens are coplanar and coaxial. In an example of step 602, method 600 forms adapter housing 504 for adapter lens 503 such that exit pupil 533 of adapter lens 503 and entrance pupil 233 of camera lens 200 are coplanar when (i) adapter lens 503 is mounted in adapter housing 504, (ii) adapter housing 504 is bonded to PCB 230, and (iii) RCM 220 is surface-mounted to PCB 230.

In optional step 604, method 600 mounts the adapter lens in the adapter housing, resulting in a PCB-mountable lens adapter. In an example of step 604, method 600 mounts adapter lens 503 to adapter housing 504.

In step 606, method 600 aligns the adapter lens and the camera lens such that the adapter lens and camera lens are coaxial. In an example of step 606, method 600 aligns adapter lens 503 and camera lens 200 such that adapter lens 503 and camera lens 200 are coaxial.

Figure 7:
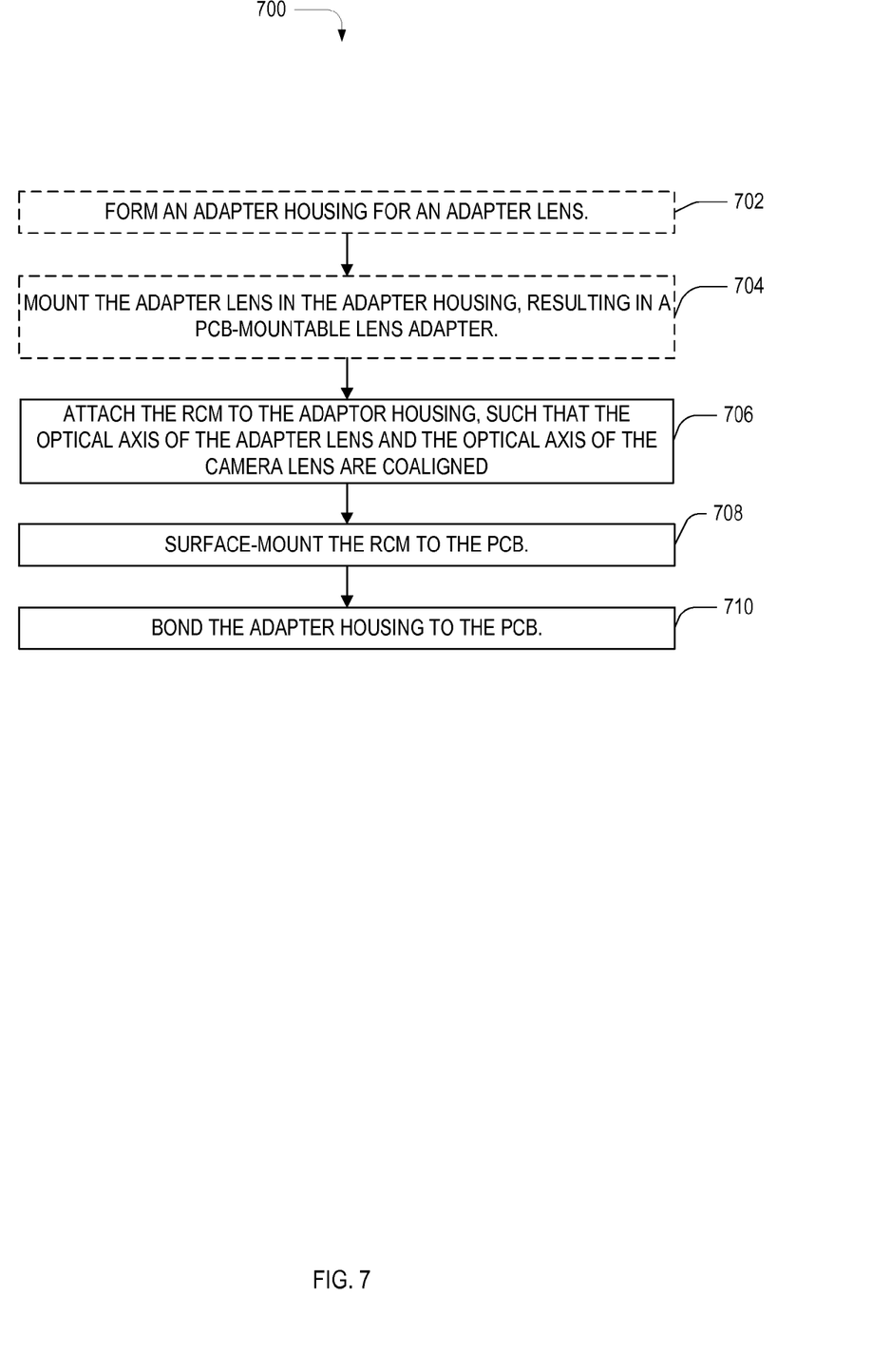
FIG. 7 is a flowchart illustrating another method for modifying the field of view of an RCM, where the RCM is not yet bonded to a PCB, in an embodiment.

In step 610, method 600 attaches the adapter housing to the PCB, the RCM surface-mounted thereto. In an example of step 610, method 600 attaches adapter housing 504 to PCB 230, RCM 220 being surface-mounted thereto FIG. 7 is a flowchart illustrating an exemplary method 700 for modifying the field of view of an RCM, where the RCM is not yet bonded to a PCB. In optional step 702, method 700 forms adapter housing. The adapter housing is formed such that an exit pupil of the adapter lens and an entrance pupil of the camera lens are coplanar and coaxial. In an example of step 702, method 700 forms adapter housing 504 for adapter lens 503 such that exit pupil 533 of adapter lens 503 and entrance pupil 233 of camera lens 200 are coplanar when (i) adapter lens 503 is mounted in adapter housing 504, (ii) adapter housing 504 is bonded to PCB 230, and (iii) RCM 220 is surface-mounted to PCB 230.

In optional step 704, method 700 mounts the adapter lens in the adapter housing, resulting in a PCB-mountable lens adapter. In an example of step 704, method 700 mounts adapter lens 503 in adapter housing 504, resulting in PCB-mountable lens adapter 500.

In step 706, method 700 attaches the RCM to the adapter housing, such that the adapter lens and the camera lens are coaxial. In an example of step 706, method 700 attaches RCM 220 to adapter housing 504, such that adapter lens 503 and camera lens 200 are coaxial.

In step 708, method 700 surface-mounts the RCM to the PCB. In an example of step 708, method 700 surface-mounts RCM 220 to PCB 230.

In step 710, method 700 attaches the adapter housing to the PCB. In an example of step 710, method 700 attaches adapter housing 504 to PCB 230.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A PCB-mountable lens adapter for a PCB-mountable camera module, comprising:
    an adapter lens and an adapter housing for holding the adapter lens coaxially with a camera lens of the PCB-mountable camera module when both the PCB-mountable camera module and the adapter housing are coupled to a PCB;
    an exit pupil of the adapter lens being coplanar with an entrance pupil of the camera lens;
    the adapter lens and the camera lens cooperatively forming an imaging system with a field of view exceeding a field of view of the camera lens alone.

2. The PCB-mountable lens adapter of claim 1, the adapter housing and camera module being independently mountable to the PCB.

3. The PCB-mountable lens adapter of claim 1, the adapter lens and the camera lens forming a lens system that functions as a lens selected from the group consisting of: a macro lens, a zoom lens, a telephoto lens, and a wide-angle lens.

4. The PCB-mountable lens adapter of claim 1, the adapter lens and the camera lens forming a lens system that functions as a fisheye lens.

5. The PCB-mountable lens adapter of claim 1, the adapter housing being attachable to the camera module, regardless of whether the PCB is connected to one or both of the adapter housing and the camera module.

6. The PCB-mountable lens adapter of claim 1, the adapter housing comprising:
    a lens barrel for holding the adapter lens, and
    a holder for holding the lens barrel and for attachment to the PCB.

7. The PCB-mountable lens adapter of claim 6, the lens barrel being removably attached to the holder.

8. The PCB-mountable lens adapter of claim 1, the adapter housing being directly attached to the PCB.

9. The PCB-mountable lens adapter of claim 1, the adapter housing being attached to an intermediate part, the intermediate part being directly attached to the PCB.

10. The PCB-mountable lens adapter of claim 1, further comprising a coupler capable of mechanically coupling the PCB-mountable lens adapter to the PCB.

11. A method for modifying the field of view of a PCB-mountable camera module, comprising:
    attaching a PCB-mountable lens adapter to a printed-circuit board (PCB), the PCB-mountable lens adapter including an adapter lens mounted in an adapter housing, the PCB being configured for surface-mounting of the PCB-mountable camera module thereto;
    mounting the adapter lens in the adapter housing; and
    positioning the adapter lens and a camera lens of the camera module such that an exit pupil of the adapter lens is coplanar with an entrance pupil of the camera lens.

12. The method of claim 11, further comprising axially aligning the adapter lens and the camera lens.

13. The method of claim 11, further comprising attaching the PCB-mountable camera module to the adapter housing.

14. The method of claim 11, the PCB-mountable camera module being surface-mounted to the PCB.

15. The method of claim 11, the adapter housing comprising two parts, a holder and a lens barrel, the adapter lens being mounted in the lens barrel.

16. The method of claim 15, the lens barrel being removably attached to the holder.

17. A PCB-mountable lens adapter for a PCB-mountable camera module, comprising:

an adapter housing for positioning an exit pupil of an adapter lens in the same plane as an entrance pupil of a camera lens of the PCB-mountable camera module when (i) the adapter lens is mounted in the adapter housing, (ii) the adapter housing is attached to a PCB, and (iii) the PCB-mountable camera module is surface-mounted to the PCB.

18. The PCB-mountable lens adapter of claim 17, wherein the adapter housing axially aligns the adapter lens and the camera lens when (i) the adapter lens is mounted in the adapter housing, (ii) the adapter housing is attached to the PCB, and (iii) the PCB-mountable camera module is surface-mounted to the PCB.

* * * * *